Dec. 23, 1952 N. D. COLVIN 2,622,383
DISMOUNTABLE TRACTOR MOWER

Filed Aug. 11, 1950 4 Sheets-Sheet 1

Fig. 1

INVENTOR.
N. D. Colvin
BY
Parker and Hillworth
Attorneys

Fig. 2

INVENTOR.
N. D. Colvin
Attorneys

Dec. 23, 1952 N. D. COLVIN 2,622,383
DISMOUNTABLE TRACTOR MOWER
Filed Aug. 11, 1950 4 Sheets-Sheet 3

INVENTOR.
N. D. Colvin
BY
Attorneys

Dec. 23, 1952  N. D. COLVIN  2,622,383
DISMOUNTABLE TRACTOR MOWER
Filed Aug. 11, 1950  4 Sheets-Sheet 4

INVENTOR.
N. D. Colvin
BY
Attorneys

Patented Dec. 23, 1952

2,622,383

UNITED STATES PATENT OFFICE 2,622,383

DISMOUNTABLE TRACTOR MOWER

Nolan D. Colvin, Moline, Ill., assignor to Deere & Company, Moline, Ill., a corporation of Illinois Application August 11, 1950, Serial No. 178,842

16 Claims. (Cl. 56—25)

1

This invention relates to an agricultural implement and more particularly to a detachable mower especially provided as an attachment for agricultural tractors of various known types.

The invention is still further characterized in that it relates to the type of mower that is carried on a tractor intermediate the front and rear tractor wheels and below the tractor body, the cutting mechanism extending grasswardly at the right-hand side of the tractor and just ahead of the right-hand traction wheel. Because of the intermediate location of the mower, as just outlined, there are many problems involved in the attachment of the mower frame to and detachment of the mower frame from the tractor that are not present in mowers of the drawn or rear-mounted type. Primarily, there is involved the problem of positioning the tractor and mower frame while the latter rests in detached or idle position on the ground, following which the mower frame must be elevated for attachment to the tractor body. Since the mower frame parts are quite heavy and difficult to handle, considerable emphasis is placed upon the elimination of as many difficulties as is possible while still retaining desirable functional characteristics of the mower. Also, it is desirable that all operating parts of the mower be carried to as great an extent as possible directly on the mower frame and independently of the tractor. Of course, not all components can be so arranged, especially in tractor-mower units in which adjustment of the cutting mechanism is accomplished by means of power derived from the tractor. Consequently, the control connections must be made readily detachable and attachable. Likewise, the power shafting between the cutting mechanism and the tractor power take-off shaft must be accommodated to the situation.

The principal object of the present invention is generally to provide a mower having support and operating components so arranged as to facilitate the attachment of the mower to and the detachment of the mower from the tractor. To this end, the mower and its related parts are so designed as to utilize power for raising and lowering the mower between detached and attached positions. It is a further feature of the mower structure to arrange the control or adjusting means for the adjustable cutter bar in such manner that the parts are completely independent of the body with the exception of a detachable connection to a power-transmitting member typical of the power lift arms found on most conventional agricultural tractors. A still further fea-

2 ture of the invention resides in the utilization of a flexible power-transmitting element for connection between the power lift arm and selectively alternately connectible to the adjustable part of the cutting mechanism or to intermediate power-transfer means for raising and lowering the mower between its detached and attached positions.

Other objects of the invention relate to the provision of a simplified frame structure which may be mounted below the tractor body and intermediate the tractor front and rear wheels by means including simple and easily manipulatable fasteners; the utilization of a mounting member embracing the tractor bell housing from below and having these fasteners providing for fore and aft shifting of the frame relative to the tractor so that the rear end portion of the frame may be received by implement-receiving portions on the tractor; and to provide means whereby the mower frame is rigidly fixed to the tractor in its operating position.

The foregoing and other important objects and desirable features inherent in and encompassed by the invention will become apparent as the disclosure of a preferred embodiment of the invention is developed in the annexed specification and drawings.

The tractor chosen for the purposes of illustration comprises a longitudinal body 10 carried on front and rear wheel means. The front wheel means includes a transverse axle 12 and right- and left-hand front wheels 14 and 16. The rear wheel means includes a transverse axle housing structure 18 and right- and left-hand traction wheels 20 and 22. Throughout the specification, the terms right- and left-hand are used with respect to the sides of the structure as seen by an observer standing behind the tractor and looking forwardly.

The tractor body is made up of a relatively short transmission housing 24 secured to the front of the rear axle housing structure 18; a longitudinally extending tubular propeller shaft housing 26, rigidly secured to the front of the transmission housing 24; and a forward power plant in the form of an internal combustion engine 28 having a rear, enlarged and generally circular bell housing 30.

The forward portion of the tractor body further includes conventional radiator grille and hood structure 32 which terminates at its rear end substantially at the junction of the body parts 24 and 26. A steering wheel shaft 34 for the front wheels 14 and 16 projects rearwardly from the structure 32 and carries a steering wheel 36 proximate to a rear mounted operator's seat 38. The seat 38 is mounted on housing structure 40 within which is located power means having a transverse rockshaft 42. The structure illustrated is merely representative of many forms of power means that could be used. That shown is patterned generally after the subject matter of the U. S. Patent to Worstell 2,477,710. The rockshaft projects outwardly at the opposite sides of the housing 40 and at its left-hand end has keyed thereto a power output member or arm 44.

Another structural part of the tractor is a drawbar 46 comprising a transverse member 48 and right- and left-hand, longitudinally extending side members 50 and 52. The right- and left-hand ends of the transverse rear axle structure 18 respectively include depending gear housings 54 and 56 to which the drawbar side members may be respectively secured, as by suitable fasteners 58 and 60. These, however, are incidental details and may vary on different tractors. For all practical purposes, the drawbar 46 may be considered a rigid or fixed structural part of the tractor. A characteristic of the drawbar illustrated is that it has rigidly fixed to the transverse bar 48 a forwardly extending apertured ear 62, ordinarily used for the connecting of implements to the drawbar. The purpose of this ear in the present design will be brought out below (see Fig. 5).

The drawbar 46 further provides upright attaching or mounting elements 64 and 66 mounted respectively on the drawbar side members 50 and 52. Each of these elements is apertured, as shown at 68 for the element 66, it being understood that the other element 64 also has an aperture (not shown) therein.

The present tractor, like most conventional agricultural tractors, is provided with a rearwardly extending power take-off shaft 70, which derives power from the internal combustion engine 28 in the usual manner.

The bell housing 30 has right- and left-hand mounting pads 72 and 74 normally used in this particular tractor for the purpose of connecting implements to the tractor. Each of these pads is drilled and tapped, as suggested at 76 in Figure 6. The tractor further includes a second pair of implement-attaching portions, designated here generally by the numerals 78 and 80. These mounting portions are transversely spaced and alined and are located respectively at the right- and left-hand sides of the tractor body in rearwardly spaced relation to the mounting pads 72 and 74, being positioned substantially at the junction of the body components 24 and 26 (see Figure 6). Each of these mounting portions is provided with a forwardly opening slot 82, as suggested in Figure 6. Since these two portions are identical and since the left-hand portion is clearly shown in Figure 6, no further description thereof is deemed to be necessary.

The foregoing completes a description of the general structure of the tractor, with emphasis on certain characteristics of the tractor for which the presently disclosed mower is especially designed. The following descriptive matter will pertain to the mower as an attachment for this or similar tractors.

The mower structure comprises essentially a main mower frame 84 preferably in the form of U as viewed from above and adapted to be disposed in a horizontal plane below the level of the tractor body 10 and intermediate the front and rear tractor wheels. This frame comprises a transverse member or bight 86 and right- and left-hand longitudinally extending legs or sides 88 and 90. The longitudinal extent of the frame 84 is somewhat greater than the longitudinal distance between the mounting pads 72—74 and the mounting portions 78—80.

Figures 6, 7, 8:
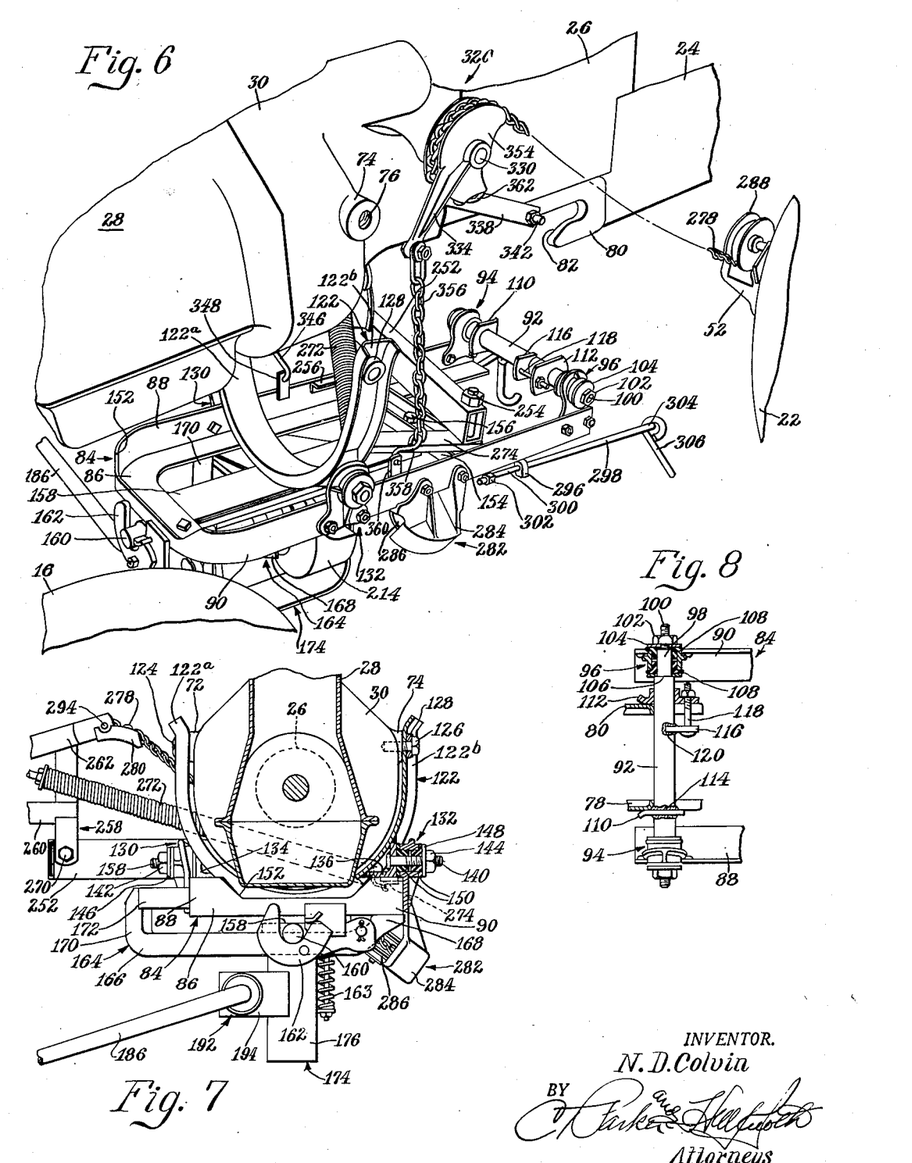
Figure 6 is a fragmentary perspective view, on an enlarged scale, illustrating the manner in which the mower structure is mounted on or dismounted from the tractor.
Figure 7 is a fragmentary transverse sectional view drawn to an enlarged scale and taken on the line 7—7—7—7 of Figure 1.
Figure 8 is a transverse fragmentary sectional view on an enlarged scale as seen generally along the line 8—8 of Figure 2.

The rear ends of the legs or side elements 88 and 90 are rigidly cross connected by a transverse member or bar 92 connected respectively at its right- and left-hand ends to the right- and left-hand sides 88 and 90 by bracket means 94 and 96. The bracket 96 is shown in section in Figure 8. Since both brackets are identical, only the bracket 96 will be described. As shown in Figure 8, the left-hand end of the transverse bar 92 is reduced at 98 and threaded at 100 to receive a nut 102 and washer 104 for confining between the washer 104 and a shoulder 106 on the bar 92 a pair of bushings 108 of rubber or similar elastic cushioning material.

In the mounting of the mower frame 84 on the tractor body 10, the bar 92 is received by the forwardly opening slots in the mounting portions 78 and 80. To facilitate the mounting of the mower frame, the transverse bar carries thereon transversely spaced, right- and left-hand guide means or members 110 and 112. These pass respectively outside the outer surfaces of the right- and left-hand mounting portions 78 and 80 and serve to fix the mower frame 84 against transverse displacement relative to the tractor body. The right-hand guide member is preferably rigidly fixed, as by welding at 114, to the transverse bar 92. The left-hand guide member is slidable along the bar 92 for purposes of adjustment and also to function as part of clamping means including a rigidly fixed lug 116 and clamping bolt 118. The lug 116 is preferably welded at 120 to an intermediate portion of the bar 92 so that it is inwardly of the left-hand mounting portion 80. Tightening of the nut on the bolt 118 will effect a clamping action on the mounting portion 80.

Mounting of the forward portion of the mower frame 84 on the tractor body is accomplished by means of a transverse, upright, U-shaped mounting member 122. This member is shaped to embrace the bell housing 30 from below and the upper ends of the right- and left-hand elements or legs 122ª and 122ᵇ of this member are apertured in alinement to receive right- and left-hand cap screws or equivalent fastener means 124 and 126, which are respectively received by the tapped mounting pads 72 and 74 of the bell housing. The detailed structure involved in the connections at these points is illustrated for the left-hand side of the member 122 in Figure 7, wherein it is shown that the upper end of the leg element 122ᵇ is provided with a welded drilled boss 128 through which the cap screw 126 passes. The structure at the other side is identical. The member 122 is thus detachably connected to the tractor body and the mower frame 84 is therefore detachably connected to the tractor body at the two longitudinally spaced mounting means 72—74 and 78—80.

The mounting member 122 is connected to the mower frame 84 in a novel manner. Specifically, the right- and left-hand side elements or members 88 and 90 of the mower frame 84 are provided respectively with supporting bracket means 130 and 132. These are transversely alined and comprise respectively angles 134 and 136 welded to lower portions of the member 122. Integral, outwardly extending threaded studs 138 and 140 project respectively from the angles 134 and 136 and respectively through the bracket means 130 and 132. Nuts 142 and 144 and washers 146 and 148 are respectively received by the studs 138 and 140. The left-hand assembly is shown in section in Figure 7, wherein it will be seen that a pair of bushings 150 of rubber or equivalent elastic cushioning material are confined between the washer 148 and the proximate angle 136. The construction at the right-hand side is the same. Thus, the mounting of the member 122 on the mower frame 84 is resilient as well as pivotal. In other words, because of the connections at 130 and 132 and 124 and 126, the elements or legs 122ª and 122ᵇ of the member 122 serve as pendulums to provide for limited relative fore and aft movement between the tractor and mower frame 84. In the mounting of the member 122 on the bell housing pads 72 and 74, the fasteners comprising the cap screws 124 and 126 also provide, before being tightened, for limited relative fore and aft movement between the member 122 and the tractor body, which is important from the standpoint of facilitating connection or disconnection between the bar 92 and the rear mounting portions 78 and 80, as will be described below in greater detail.

The front portion 86 of the mower frame 84 is cut out at 152 to accommodate the crankcase of the engine 28 (Figure 7). From the description thus far, it will be seen that the mower frame 84 can be mounted on or dismounted from the tractor entirely from below the tractor body. No part of the mower frame, other than the mounting portions thereof, projects above the general level of the tractor body. As will be brought out in greater detail below, none of the components or members carried by the mower frame cross above the tractor or in any other manner interfere with the quick and easy mounting and dismounting of the mower frame.

A transverse support or member 154 cross connects the side members 88 and 90 of the mower frame 84 just ahead of the transverse bar 92. This transverse bar has centrally thereof means 156 providing a pivot on a vertical axis for the mounting of a single, longitudinally extending support 158, which is located entirely at a level below the level of the mower frame 84. The forward end of the longitudinal support 158 projects past the transverse portion 86 of the mower frame 84 in the form of a latch stud or member 160. This stud cooperates with releasable latch elements 162, spring-loaded at 163 (Fig. 7), for the purpose of holding the longitudinal support 158 in a normal straight-ahead position. The latch means itself forms no part of the present invention and is merely representative of many forms of latches that could be used. That illustrated forms the subject matter of the U. S. Patent to Coultas 2,292,362.

Lateral swinging movement of the longitudinal support 158 about the pivot 156 is limited to the right or in a grassward direction by limit or guide means 164 at the front end of the mower frame 84. This means includes a transverse horizontal portion 166 below and for sustaining the forward end of the longitudinal support 158. This horizontal portion 166 terminates at its left-hand end in an upturned leg portion rigidly secured to the left-hand side element 90 of the mower frame 84. The right-hand end of the means 164 has an upturned leg 170 rigidly secured to an outrigger portion 172 that is in turn rigidly secured to the right-hand side element 88 of the mower frame. The inner part of the leg portion 170 serves as a stop against which the longitudinal support 158 may abut when it swings to the right or grasswardly about the pivot 156, as will be more clearly explained below.

The longitudinal support 158 has rigidly secured thereto and depending therefrom an upright, longitudinal U-shaped supporting member 174, front and rear legs 176 and 178 of which provide respectively longitudinally spaced supports disposed below the level of the longitudinal support 156. A rear depending supporting element or leg 180 provides the third in the series of the three longitudinally spaced apart elements (176, 178 and 180). The front and rear elements 176 and 180 serve as means for carrying a mower cutting mechanism designated generally by the numeral 182. The connection of the cutting mechanism to the mower frame 84 is accomplished by means of a generally conventional yoke 184, a drag bar 186, and a push bar 188. The drag bar extends transversely of the tractor and has its inner or stubbleward end provided as a longitudinal pivot 190 connected to the front supporting element 176 of the support 174 by bushing means, designated generally by the numeral 192, providing a pivot on a longitudinal horizontal axis. The bushing means is carried in an outwardly extending plate 194 (Figure 7) rigidly secured to the front supporting element 176. The outer or grassward end of the drag bar may be connected in any suitable manner to the yoke 184, as shown at 196.

The outer or grassward end of the push bar 188 is received at 198 in a sleeve portion in the yoke 184. The rear, inner or stubbleward end of the push bar is carried in a bearing or bushing 200 coaxial with the pivot at 190—192. Thus, the cutting mechanism 182 is free to rise and fall about the longitudinal horizontal pivot axis through 190—200 as the mower encounters uneven terrain. Broadly, pivotal arrangements of this character are not new. In the present instance, either or both of the bushing or bearing means 192 and/or 200 may include elastic material of the type illustrated for the front mounting bushing 132 in Figure 7.

Figure 1:
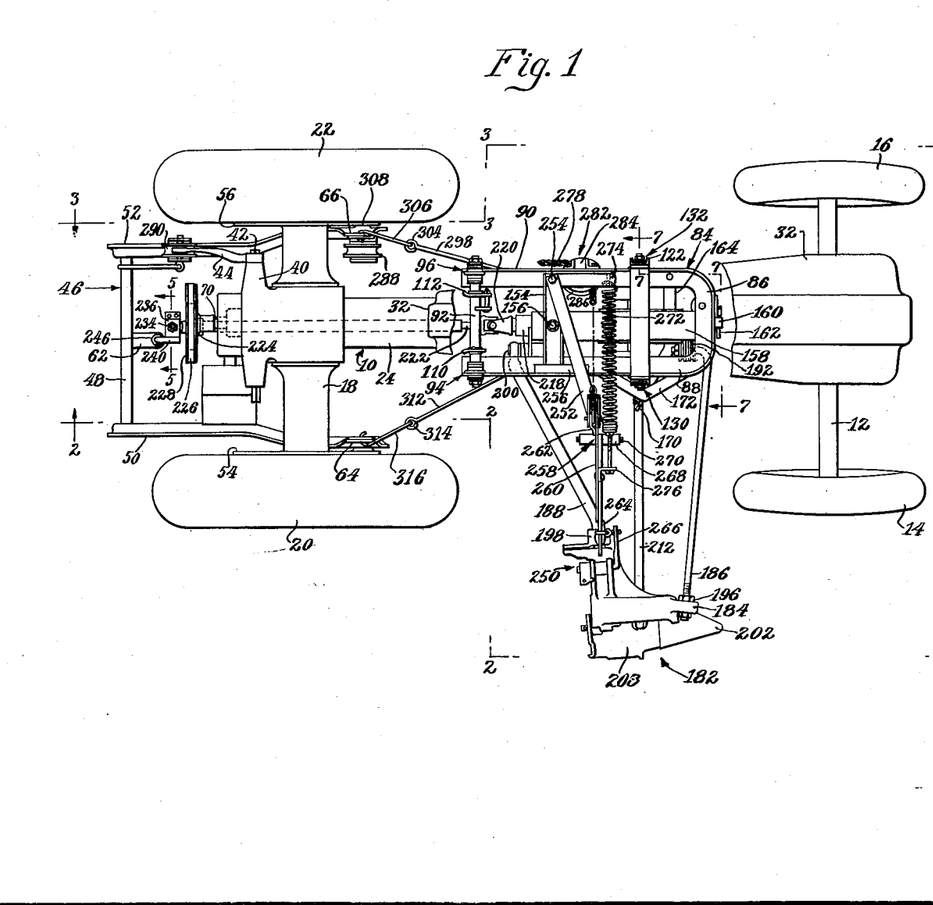
Figure 1 is a plan view of the mower attachment as mounted on a tractor, an intermediate portion of the tractor being omitted from the view to expose the mower structure.

The cutting mechanism further includes an inner ground-engaging shoe 202 pivoted to the yoke 184 on a longitudinal horizontal axis through pivots 204 and 206. A sickle 208 of conventional construction is carried for reciprocation by a laterally outwardly extending cutter bar 210. The sickle is reciprocated by a transversely extending pitman 212 connected at its inner end to an eccentric on a rotating flywheel 214. The flywheel is fixed to the forward end of a longitudinally extended shaft 216 journalled in a longitudinal bearing 218 fixed at its front and rear end portions respectively in the longitudinally spaced supports 178 and 180. As will be seen in Figure 1, the longitudinal axis through the cutter bar supporting pivot 190—200 is laterally offset to the right from the rotating axis of the flywheel shaft 216. Nevertheless, the two axes or pivots are close enough together so that rise and fall of the cutting mechanism about the axis through 190—200 does not interfere with the driving mechanism from the pitman to the knife 208.

The rear end of the shaft 216 has a universal joint connection at 220 with the forward end of a telescopic shaft assembly 222. The rear end portion of the shaft assembly 222 has fixed thereto a driving sheave 224, and a driving belt 226 is trained about this sheave and about a larger sheave 228 keyed to the tractor power take-off shaft 70.

Figures 3, 4, 5:
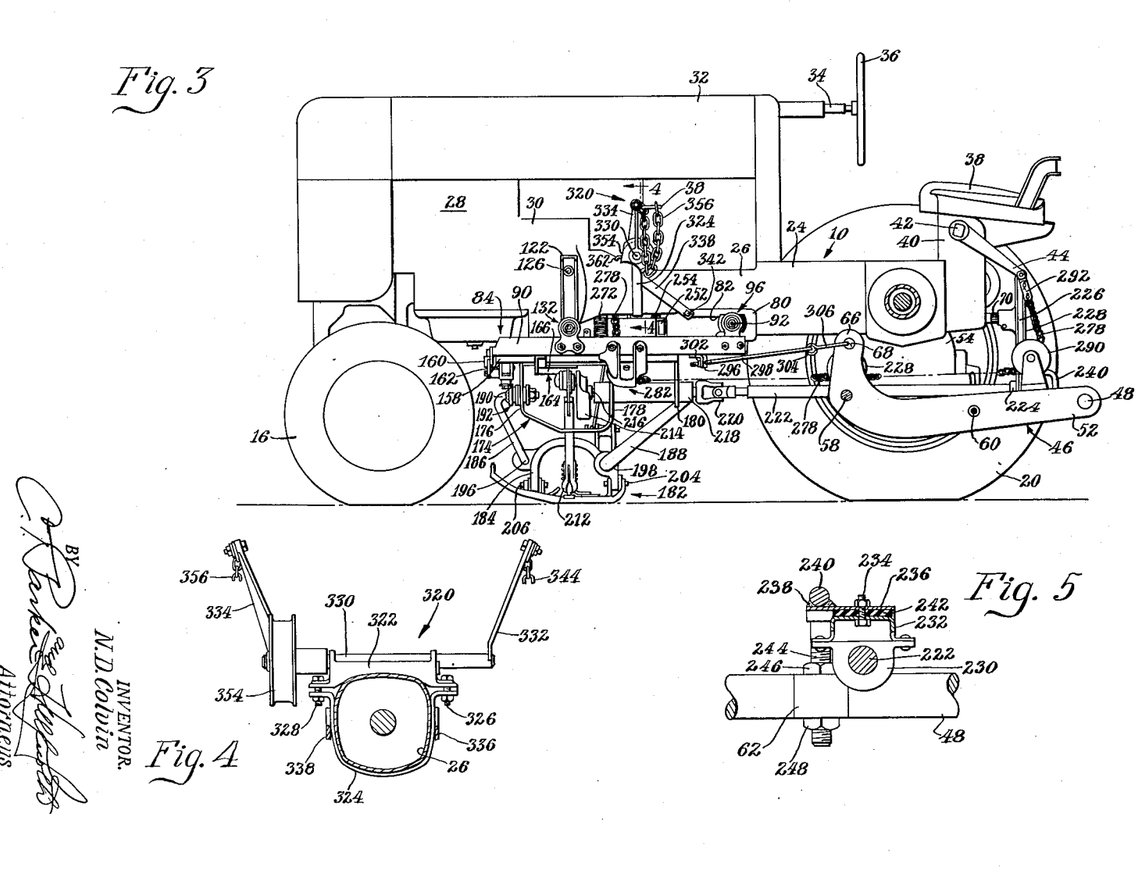
Figure 3 is a view from the opposite side, as seen along the line 3—3—3—3 of Figure 1.
Figure 4 is a transverse fragmentary sectional view on an enlarged scale as seen along the line 4—4 of Figure 3.
Figure 5 is a fragmentary transverse sectional view on an enlarged scale, the view being taken along the line 5—5 of Figure 1.

The rear end portion of the shaft assembly 222 projects rearwardly behind the sheave 224 and is journaled in a bearing 230 that is resiliently supported by the drawbar ear 62 (Figure 5). The supporting means for the bearing 230 includes a preferably metal bracket 232 rigidly secured to the bearing 230 and centrally apertured to receive a vertical bolt 234 which passes through a horizontal plate 236 rigidly secured, as by welding at 238, to a supporting member in the form of a bent rod 240. Resilient or elastic cushioning material such as rubber is interposed at 242 between the bracket 232 and the horizontal plate 236. Vibrations incident to rotation of the shafting 222—216 are thus isolated somewhat from the tractor drawbar structure 46. The bent rod 240 has its vertical portion threaded at 244, which portion passes through the apertured drawbar ear 62 to receive upper and lower adjusting and lock nuts 246 and 248. Alinement of the shaft 222 with respect to the level of the axis of the flywheel shaft 216 may be obtained by the adjustment just described.

The bolt 234 also provides a pivotal mounting for the rear end of the telescopic shafting 222, so that, as the cutting mechanism swings rearwardly with the longitudinal support 158 about the vertical pivot 156, the shafting may be accommodated to the new position. The telescopically connected parts of the shafting 222 contribute to the functioning in this respect, as does the universal joint at 220. Therefore, the driving mechanism may continue to operate even though the cutting mechanism swings rearwardly about the pivot 156, as it will when it strikes an obstruction of a predetermined magnitude, as is well known to those versed in the art. Of course, there will be a slight misalinement of the planes in which the sheaves 224 and 228 operate; however, this will be accommodated by the flexible belt 226.

The cutter bar 210 may be tilted relative to the yoke 184 about the longitudinal horizontal pivot axis 204—206. For this purpose, the yoke 184 carries (Figure 1) conventional gag lever mechanism or linkage 250. In this respect, the cutter bar constitutes an adjustable part carried by the mower frame and related structure.

Adjusting means for the tiltable part or cutter bar 210 is carried by the mower frame 84 substantially entirely independently of the tractor. Therefore, mounting of the frame on or dismounting of the frame from the tractor is not interfered with by the control or adjusting means. This control or adjusting means comprises essentially a transversely and slightly forwardly extended carrying member 252 pivoted at its inner end at 254 on a vertical axis slightly offset to the left of the pivot axis 156 between the member 154 and the longitudinal mower support 158. The carrying member 252 extends across and above the right-hand or grassward side element 88 of the frame 84 and is sustained by that side element by means of a longitudinal strip 256 on which the member 252 can slide fore and aft when necessary. The outer or grassward end of the member 252 carries an adjusting member thereon in the form of a bell crank 258 having a first arm 260 and a second arm 262. The first arm extends grasswardly and has a lifting connection 264 with a lever 266 forming part of the gag lever mechanism 250. A longitudinally extending bracket 268 is rigidly secured to the outer or grassward end of the carrying member 252 and this bracket provides a pivot on a longitudinal horizontal axis at 270 for pivoting the bell crank 258 to the member 252. Thus, rocking of the bell crank 258 about its pivot at 270 will effect adjusting or raising and lowering of the cutter bar 210.

A counterbalancing and assist spring 272 is anchored at its inner end in any appropriate manner to an arm rigid on the member 252 and projecting forwardly above the side element 90 to a point somewhat ahead of the pivot 254. The outer end of the spring 272 is connected at 276 to an outer portion of the bell crank 258. The spring 272 counterbalances the weight of and assists in raising the cutter bar 210. Since the bell crank 258 is connected through 264—266—250 to the cutting mechanism 182, the bell crank and member 254 will swing rearwardly as the cutter bar swings rearwardly. The cutter bar will, of course, swing about the pivot 156. The member 252, carrying with it its associated parts, will swing about the pivot 254. When the cutter bar is returned to its normal or operating position, the connection 264 will return the member 252 and bell crank 258 to their normal positions. As best shown in Figure 7, the angle of the spring 272 is such that it passes completely below and does not interfere with any portion of the tractor body in the zone of the tractor body to which the mower frame 82 is attached. Thus, as the mower frame is mounted on or dismounted from the tractor, there will be no need to disconnect the spring 272. This is in keeping with the fundamental design in wihch all components of the mower structure are kept clear of tractor components, which result is achieved primarily by keeping critical connections outside of or below the mower supporting frame 84.

The cutter bar may be adjusted relative to the mower supporting structure by means deriving power from the power arm 44. For this purpose, a flexible power-transmitting element in the form of a link chain 278 is connected at its rear end to the power arm 44 and at its forward or outer end to the bell crank arm 262. The connection of the chain 278 to the arm 262 includes an arcuate member 280 which provides means for obtaining the necessary leverage at that point. In view of the relatively widely located positions of the parts 44 and 262, the chain 278 must be guided from front to rear and transversely of the mower frame. For this purpose, the left-hand side element 90 of the mower frame 84 carries thereon guide means designated generally by the numeral 282. This means comprises a mounting bracket 284 and a sheave 286. The guide means 282 is located substantially in transverse alinement with the bell crank 258 and substantially in longitudinal alinement with the power arm 44. In addition, the guide means is located below the level of the mower frame 84, being connected to the left-hand side element 90 in such position, as best seen in Figure 7, that a straight line drawn between the guide means 282 and the connection at 280 between the chain 278 and bell crank arm 262 will pass directly below the tubular portion 26 of the tractor body 10. Again, the design emphasizes the disposition of components in such manner that they will not interfere with the tractor body in the detachment and attachment of the mower structure.

The chain 278 passes downwardly and to the left under the tractor body portion 26, around the guide means 282 and rearwardly to the power arm 44, passing on its way under a pair of guide means in the form of sheaves 288 and 290 carried by the left-hand side member 52 of the drawbar 46.

The mower frame 84 and its related components are detachably secured to the tractor body by means of the mountings at 72—74 and 78—80. The control connection of the chain 278 to the power arm 44 is preferably made disconnectible, as at 292. Likewise, the connection of the chain 278 to the bell crank 258 is disconnectible, as at 294.

Additional connections are made between the mower structure 84 and the tractor body. These, as are the others, are of the disconnectible type, and are preferably of the character illustrated.

The left-hand side element 90 of the mower frame 84 carries adjacent the rear end thereof a depending apertured ear 296 through which passes a rod 298 having its forward end threaded at 300 to receive a nut 302 and having its rear end formed as an eye 304. The eye 304 forms means for the connection to the rod 298 of a second rod 306 having a hooked rear end 308 adapted to hook into the aperture 68 of the upright element 66 at the forward end of the left-hand side 52 of the drawbar 46. The right-hand side element 88 of the mower frame 84 has a similar depending lug 310 to which is connected the threaded forward end of a rearwardly extending rod 312 identical to the rod 298. This rod has an eye 314 connected to the forward end of a rearwardly extending hooked rod 316 adapted to be received by the apertured upright element 64 at the forward end of the right-hand side member 50 of the drawbar 46. A nut 318 is threaded on the forward end of the rod 312. When the mower is in place, the hooked rods 306 and 316 are connected as aforesaid and the nuts 302 and 318 may be tightened to prevent longitudinal forward displacement of the mower frame 84 relative to the tractor body. The nuts may be readily loosened to permit unhooking of the hooked rods 306 and 316 to provide for forward shifting of the frame 84 relative to the body in the dismounting of the mower from the tractor.

An important feature of the present invention is the utilization of power derived from the power arm 44 for raising and lowering the mower structure between an idle position resting on the ground and a transport or operating position carried by the tractor. A specific feature of the invention in this respect is the utilization of the power-transmitting chain 278 for accomplishing this desirable result. For this purpose, the tractor is equipped, as part of the mower attachment structure, with intermediate power-transfer means designated generally by the numeral 320, the details of which best appear in Figures 4 and 6.

Figure 2:
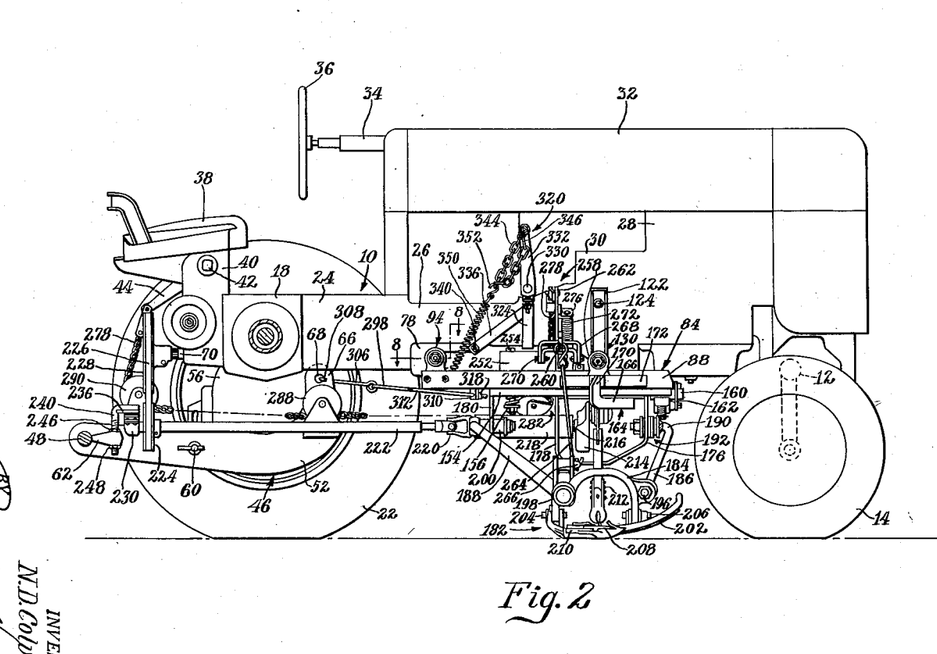
Figure 2 is a side view on the line 2—2—2—2 of Figure 1.

This means comprises a bearing 322 adapted to be disposed transversely across and above the intermediate body portion 26 of the tractor; a U-shaped strap 324 adapted to embrace the tractor body portion 26 from below; securing means in the form of a pair of nut and bolt assemblies 326 and 328 for securing the strap and the bearing together with the body portion 26 therebetween; and a transverse rockshaft 330 having at its right-hand end a power-transmitting arm 332 and having at its left-hand end a power-transmitting arm 334. The location of the means 320 relative to the tractor body and mower structure is best seen in Figures 2 and 3. The strap 324 is additionally braced relative to the tractor body by means of right- and left-hand braces 336 and 338 secured respectively to the right- and left-hand mounting portions 78 and 80 as at 340 and 342. Thus, for normal purposes, the means 320 may be considered a rigid or fixed part of the tractor; although, the arrangement is such that the means may be readily attached to or detached from the tractor at any time found desirable.

The arms 332 and 334 are fixed or otherwise keyed to the rockshaft 330 for rocking therewith. The right-hand arm 332 is provided with a lift means in the form of a flexible element or chain 344 which has at its lower end a hook 346 (Figure 6) adapted to hook into an upstanding apertured ear 348 carried by the right-hand side element 88 of the mower frame 84. When the chain 344 is not utilized for connection to the apertured ear 348, it may be doubled upon itself as shown in Figure 2, and the position of the rockshaft and arm assembly may be retained by means comprising a spring 350 anchored at its lower end to the mower frame 84 and having at its upper end a hook 352 for removable connection to the doubled chain 344.

The left-hand arm 334 on the rockshaft 330 includes as an integral part thereof the segment of a sheave, as at 354. The terminal end of the arm has connected thereto the upper end of a chain 356 and the lower end of the chain is provided with a hook 358 to provide means for disconnectible attachment to an upstanding apertured ear 360 rigidly secured to the left-hand side element 90 of the mower frame 84 (Figure 6). When the chain 356 is not in use, it may be doubled upon itself as shown in Figure 3. Since the two arms 332 and 334 are fixed to the rockshaft 330, the retaining spring 350 will hold the entire assembly in the position illustrated. The sheave segment 354 has fixed thereto a forwardly extending hook 362 which is adapted to receive the forward end of the power-transmitting chain 278 (Figure 6), this chain having been disconnected from the bell crank 258 at 294. The sheave segment 354 constitutes means for taking up slack in the chain 278. Furthermore, since the chain is of the link type, any appropriate link may be connected to the sheave segment by means of the hook 362.

The connection at 278—362 is effected only when the mower is being mounted on or dismounted from the tractor, as will be set forth in greater detail below.

When the mower is in its transport position, it is carried on the tractor by means of the disconnectible connections at 72—124, 74—126, 78—92, and 80—92. The rods 298—306 and 312—316 are connected in place and the mower frame is rigidly carried by the tractor. The power-transmitting chain 278 is connected at its rear end to the power arm 44 and is trained about the sheaves 290, 288 and 286, extending from the latter in a grassward direction for connection at 280 to the bell crank 258. The power-transfer means 320 is idle during operation of the tractor-mower unit. The position of the rockshaft and arm assembly is retained by the spring 350 as shown in Figure 2.

When it is desired to dismount the mower structure from the tractor, the tractor may be driven to and stopped at the location at which it is desired to drop the mower. Power to the power take-off shaft is stopped and the chain 278 is disconnected at 280 from the bell crank 258. The chain is unreeved from the pulley 286 on the guide means 282 and the front end thereof is hooked over the hook 362 on the sheave segment 354 of the left-hand lift arm 334, the user first having disconnected the spring 350 and having hooked the chains 344 and 356 respectively to the apertured ears 348 and 360 on the frame 84. The power means 40 is actuated so that the power arm 44 is swung upwardly, or in the direction that it would be swung were it desired to adjust the cutter bar about the shoe and yoke axis at 204—206. This will hold the arms 332 and 334 in their substantially uppermost positions and the chains 344 and 356 will be substantially taut between the arms and the frame 84. Next, the rods 298—306 and 312—316 are disconnected. The clamping bolt 118 is loosened and the cap screws 124 and 126 are loosened. It is now possible to manually shift the mower structure forwardly relative to the tractor so that the bar 92 comes out of the slotted mounting portions 78 and 90. The cap screws 124 and 126 may then be removed. As an alternative, the cap screws 124 and 126 may be removed prior to shifting of the frame 84 forwardly, thus leaving the frame suspended by the bar 92 at 78 and 80 and by the lift chains 344 and 356. Since none of the components of the mower structure cross above the tractor body, operation of the power means 40 to swing the arm 44 downwardly will function through the chain 278 to lower the mower structure to its ground-borne position. As or after the mower structure is lowered, the support of the telescopic shafting 222 on the drawbar ear 62 by means of the rod 240 may be readily removed, the belt 226 being removed from the sheaves 224 and 228 to complete the disconnection of the mower structure from the tractor. The chains 344 and 356 may be disconnected from the sides of the mower frame 84 and the tractor may be backed away, leaving the mower resting idly on the ground. Driving the tractor away from the ground-supported mower may be accomplished as follows: After all disconnections are made, the tractor is advanced until the right-hand rear wheel reaches the drag bar 188. The tractor front wheels are then cramped to the right and the tractor reversed, the front end swinging in an arc substantially about the right-hand rear wheel (which can be conventionally braked). The front wheels thus clear the mower. It will be noted that the proportions of the parts are such that the body parts 24 and 28 are sufficiently high to pass over the mounting member 122 when the mower is resting on the ground.

Mounting of the mower on the tractor may be just as easily effected by reversing the operation just described. Briefly, all that is involved is driving of the tractor into position over the ground-supported mower, making the necessary connections and utilizing power to raise the mower to position. Since the weight of the mower is borne by the power connections, it is a simple matter to manually shift the mower so that the necessary connecting parts will line up.

As stated above, the primary consideration in the development of the mower constructed according to the principles of the present invention is the elimination of difficulties in the mounting of the mower on and the dismounting of the mower from the tractor, particularly as made possible by arranging these parts so that none of them cross above the body of the tractor, thereby making it possible for the mower to be raised and lowered between its positions with the greatest of ease. The driving arrangement is also simplified to the extent that it has but a single point on the tractor and only a single connection to the mower.

Other features of the invention not specifically enumerated above will undoubtedly occur to those versed in the art, as likewise will numerous modifications and alterations in the preferred embodiment of the invention illustrated, all of which may be achieved without departing from the spirit and scope of the invention as defined in the appended claims.

What is claimed is:

1. For use with a tractor having a longitudinal body carried at its front and rear ends on front and rear wheels and including at its rear end power means having an arm swingable about a transverse axis: mower structure comprising a support having opposite side portions and adapted for positioning beneath the tractor body intermediate the front and rear wheels; means for securing the support to the tractor body in an elevated operating position clear of the ground, said means including provision for detachment of the support from the tractor body for disposition of the support in an idle position resting on the ground; an adjustable part movable on the support; power-transmitting means including an elongated flexible element having a first end detachably connected to the adjustable part and a second end connectible to the tractor power arm so that the arm is operative to effect adjustment of said part when the support is in operative position; a rockshaft; means for mounting the rockshaft on and to extend transversely across the tractor body directly above the support; a pair of arms fixed to and spaced axially on the rockshaft for swinging respectively in vertical planes at the sides of the tractor body; lifting elements connected respectively to the rockshaft arms and detachably connectible respectively to the side portions of the support for use in raising or lowering the support between its idle and operating positions; and power-receiving means on the rockshaft for detachable and operative connection to the aforesaid first end of the power-transmitting flexible element when said end is detached from the adjustable part, whereby the rockshaft arms are powered by the tractor power arm to raise or lower the support between idle and operating positions.

2. The invention defined in claim 1, further characterized in that: the power-receiving means has provision thereon for taking up slack in the power-transmitting flexible element.

3. The invention defined in claim 1, further characterized in that: retaining means is connectible between the rockshaft and the tractor body for retaining the rockshaft and rockshaft arms in an inoperative status when the lifting elements are detached from the side portions of the support.

4. For use with a tractor having a longitudinal body carried at its front and rear ends on front and rear wheels and including a movable power output member: implement structure adapted to be raised and lowered between an idle position resting on the ground adjacent the tractor and an elevated operating position substantially directly above the idle position and relatively remote from the power output member; means for detachably securing the implement structure to the tractor body; an adjustable part movably carried by the implement structure; an elongated power-transmitting element connectible to the power output member and detachably connected to the adjustable part for effecting adjustment of the latter when the implement structure is secured to the tractor body in its operating position; normally idle, intermediate power-transfer means having provision for fixed mounting on the tractor body substantially directly above the operating position of the implement structure; lifting means connected to the power-transfer means and detachably connectible to the implement structure; and means on the power-transfer means for effecting connection with the elongated power-transmitting element when said element is detached from the adjustable part so that the power-transfer means derives power from the power output member to effect raising or lowering of the detached implement structure through the lifting means.

5. For use with a tractor having a longitudinal body carried at its front and rear ends on front and rear wheels and including a movable power output member: implement structure adapted to be raised and lowered between an idle position resting on the ground adjacent the tractor and an elevated operating position; means for detachably securing the implement structure to the tractor body; an adjustable part movably carried by the implement structure; power-transmitting means connectible to the power output member and detachably connected to the adjustable part for effecting adjustment of the latter when the implement structure is secured to the tractor body in its operating position; normally idle, intermediate power-transfer means having provision for fixed mounting on the tractor body substantially directly above the operating position of the implement structure; lifting means connected to the power-transfer means and detachably connectible to the implement structure; and means on the power-transfer means for effecting connection with the power-transmitting means when said power-transmitting means is detached from the adjustable part so that the power-transfer means derives power from the power output member to effect raising or lowering of the detached implement structure through the lifting means.

6. For use with a tractor having a longitudinal wheel-supported body including a transversely enlarged housing portion intermediate its front and rear ends and further having a pair of transversely spaced apart side portions rearwardly of the housing portion: a mower-supporting structure, comprising an elongated U-shaped frame adapted for disposition in a horizontal plane below and to extend lengthwise of the tractor body, with the bight portion of the U ahead of the housing portion and the legs of the U terminating in rear end portions proximate respectively to the tractor body side portions; an upright U-shaped mounting member transverse to the U-shaped frame and adapted to embrace the housing portion from below and having leg elements projecting above the plane of said U-shaped frame and provided with means for detachably securing said member to opposite sides of the housing portion; means including pivots aligned on a transverse horizontal axis respectively interconnecting the legs of the mounting member and the legs of the frame; a transverse bar cross-connecting the rear end portions of the legs of the frame; and means on said bar for detachable connection to the tractor body side portions.

7. Mower structure as defined in claim 6, further characterized in that the pivot means between the mounting and frame members includes elastic cushioning material.

8. Mower structure as defined in claim 6, further characterized in that the connection of the transverse bar to the rear end portions of the legs of the frame includes elastic cushioning material.

9. Mower structure as defined in claim 6, further characterized in that the detachable connecting means on the transverse bar includes a pair of connectors spaced along the bar so as to respectively engage the tractor body side portions, one of said connectors is shiftable lengthwise of the bar, and means is provided for securing said one connector in a selected position.

10. For use with a tractor having a longitudinal body carried at its front end on wheel means and at its rear end on wheel means including transversely spaced and aligned axle parts, said body further having intermediate its ends a pair of transversely spaced and aligned connecting portions, each of which has a forwardly opening slot: mower structure, comprising a longitudinal frame positionable beneath the tractor body ahead of the spaced rear elements and having front and rear end portions; a mounting member pivoted on a transverse axis to the front end portion of the frame and having a pair of transversely spaced apart upright elements projecting above the frame to embrace a portion of the tractor body from below; means on said elements for detachably securing the elements to the tractor body, said means including fasteners respectively on the elements and coaxial on a transverse axis above the first-mentioned transverse axis so that said elements serve as pendulums providing for limited fore and aft movement of the frame relative to the tractor; rear mounting means fixed to the rear end portion of the frame and respectively receivable by or releasable from the slot in the tractor body connecting portion when the frame is shifted rearwardly or forwardly relative to the tractor body; and tie members connected in transversely spaced relation to the rear end portion of the frame and connectible respectively to the spaced rear axle parts and effective to hold the frame against forward shifting relative to the tractor body when the rear mounting means is received by the slots in the tractor body connecting portions.

11. Mower structure as defined in claim 10, further characterized in that: the rear mounting means on the frame includes transversely spaced guides for facilitating receipt of said means by the slots in the tractor body connecting portions, and one of said guides includes relatively movable parts effective selectively to clamp on or release the proximate tractor body connecting portion.

12. For use with a tractor having a longitudinal mobile body including at one end thereof rear axle structure provided with transversely spaced and aligned depending housing elements, said body further having intermediate its ends a connecting portion having a forwardly opening slot: mower structure, comprising a longitudinal frame positionable beneath the tractor body ahead of the depending rear housing elements and having front and rear end portions; a mounting member at the front end portion of the frame adapted to engage a portion of the tractor body from below and having means for detachably securing the member to the tractor body, said means including provision for limited fore and aft movement of the member relative to the tractor; means connecting the member to the frame for suspending the frame at its front end portion from the tractor and including provision for limited fore and aft shifting of the frame relative to the member; rear mounting means fixed to the rear end portion of the frame and respectively receivable by or releasable from the slot in the tractor body connecting portion when the frame is shifted rearwardly or forwardly relative to the tractor body; and tie members connected in transversely spaced relation to the rear end portion of the frame and connectible respectively to the spaced rear housing elements and effective to hold the frame against forward shifting relative to the tractor body when the rear mounting means is received by the slot in the tractor body connecting portion.

13. For use with a tractor having a longitudinal body carried on front and rear wheels: mower structure, comprising an elongated U-shaped frame adapted for disposition intermediate the front and rear wheels in a horizontal plane below the level of the tractor body with the bight of the U to the front; means extending upwardly from the frame for detachably securing the frame to the tractor body; an elongated, single member disposed below the level of the frame and extending lengthwise in a normal position generally in the longitudinal median plane of the frame and having a front end portion proximate to and a rear end portion remote from the bight of the frame; means pivoting the member at its rear end portion to the frame on a vertical axis; guide means below the level of the member and frame and extending transversely at the front end of the frame for carrying the member through a limited range of angular movement about said pivot axis; a latch stud secured to the front end portion of the member and projecting ahead of the bight of the frame; releasable latch means disposed below the level of the frame and cooperative with the stud to releasably hold the member in its normal position; a support carried solely by and depending below the member and comprising an upright, longitudinal, U-shaped element having front and rear legs secured to said member; a mower bar positioned to one side of the frame and including a reciprocating sickle; a support bar pivoted on a longitudinal horizontal axis at its inner end to the front leg of the U-shaped support and connected at its outer end to the mower bar; and drive means for the sickle, including a rotary member intermediate the front and rear legs of the U-shaped member and journaled on said rear leg on a longitudinal horizontal axis.

14. For use with a tractor having a longitudinal body carried on front and rear wheels and having at its rear end a power member movable generally in a longitudinal plane: mower structure, comprising a frame positionable intermediate the front and rear wheels of the tractor and below the level of the body and having laterally spaced apart side elements; means for detachably securing the frame to the tractor body with the side elements spaced below the proximate portion of the tractor body; cutting mechanism carried by the frame independently of the tractor body and including a vertically adjustable part extending grasswardly beyond the grassward side element of the frame; an adjusting member rockably carried adjacent said grassward side element and including a first portion connected to said adjustable part and a second portion disposed above the level of said grassward side element; guide means carried on and below the other side element generally in transverse alignment with said second portion of the adjusting member and generally in longitudinal alignment with the tractor power member and positioned at such elevation that a straight line drawn through said guide and said second portion of the adjusting member passes below the tractor body and between said spaced apart side elements; and a flexible power-transmitting element connected at one end to said second portion of the adjusting member, passing transversely and downwardly along said straight line and trained around the guide means, and extending thence rearwardly for connection to the tractor power arm.

15. For use with a tractor having a longitudinal body carried on front and rear wheels and having at its rear end a power member movable generally in a longitudinal plane: mower structure, comprising a frame positionable intermediate the front and rear wheels of the tractor and below the level of the body and having laterally spaced apart side elements; means for detachably securing the frame to the tractor body; cutting mechanism carried by the frame independently of the tractor body and including a vertically adjustable part extending grasswardly beyond the grassward side element of the frame; an adjusting member rockably carried by the frame adjacent said grassward side element and connected to said adjustable part; guide means carried on the other side element generally in transverse alignment with said second portion of the adjusting member and generally in longitudinal alignment with the tractor power member; and a flexible power-transmitting element connected at one end to the adjusting member, passing transversely toward and trained around the guide means, and extending thence rearwardly for connection to the tractor power arm.

16. For use with a tractor having a longitudinal body carried at its front and rear ends on front and rear wheels and including at its rear end power means having a swingable power arm: mower structure comprising a support adapted for positioning beneath the tractor body in longitudinally spaced relation to the swingable power arm; means for securing the support to the tractor body in an elevated operating position clear of the ground, said means including provision for detachment of the support from the tractor body for disposition of the support in an idle position resting on the ground; an adjustable part movable on the support; power-transmitting means including an elongated flexible element having a first end detachably connected to the adjustable part and a second end connectible to the swingable power arm so that the swingable power arm is operative to effect adjustment of said part when the support is in operative position; a rockshaft; means for mounting the rockshaft on and to extend transversely across the tractor body adjacent to the support; an arm fixed to the rockshaft for swinging in a vertical plane; a lifting element connected to the rockshaft arm and detachably connectible to the support for use in raising or lowering the support between its idle and operating positions; and power-receiving means on the rockshaft for detachable and operative connection to the aforesaid first end of the power-transmitting flexible element when said end is detached from the adjustable part, whereby the rockshaft arm is powered by the swingable power arm to raise or lower the support between idle and operating positions.

NOLAN D. COLVIN.

REFERENCES CITED

The following references are of record in the file of this patent:

UNITED STATES PATENTS

| Number | Name | Date |
|---|---|---|
| 2,293,170 | Pokluda | Aug. 18, 1942 |
| 2,311,095 | Simpson | Feb. 16, 1943 |
| 2,368,290 | Donald | Jan. 30, 1945 |
| 2,454,697 | Hilblom | Nov. 23, 1948 |
| 2,489,274 | Donald | Nov. 29, 1949 |